United States Patent
Ponnuswamy et al.

(10) Patent No.: US 12,153,517 B2
(45) Date of Patent: *Nov. 26, 2024

(54) MONITORING GARBAGE COLLECTION CYCLES TO PROTECT STORAGE SYSTEMS FROM DATA LOSS

(71) Applicant: Dell Products L.P., Round Rock, TX (US)

(72) Inventors: Senthil Ponnuswamy, San Jose, CA (US); Mahadev Karadigudda, San Jose, CA (US); Madhu Agrahara Gopalakrishna, Fremont, CA (US); Praveen Kumar Lakkimsetti, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 372 days.

This patent is subject to a terminal disclaimer.

(21) Appl. No.: 17/579,207

(22) Filed: Jan. 19, 2022

(65) Prior Publication Data

US 2023/0229589 A1    Jul. 20, 2023

(51) Int. Cl.
   *G06F 12/02* (2006.01)
   *G06F 16/16* (2019.01)
   *G06F 21/55* (2013.01)

(52) U.S. Cl.
   CPC ........ *G06F 12/0253* (2013.01); *G06F 16/162* (2019.01); *G06F 21/554* (2013.01); *G06F 2212/1032* (2013.01); *G06F 2212/70* (2013.01)

(58) Field of Classification Search
   CPC ......... G06F 12/0253; G06F 2212/1032; G06F 2212/1052; G06F 2212/154; G06F 2212/465; G06F 2212/70; G06F 3/0608; G06F 3/0652; G06F 3/067; G06F 3/064; G06F 2212/7205; G06F 3/0604; G06F 21/554; G06F 11/0751; G06F 16/162
   See application file for complete search history.

(56) References Cited

U.S. PATENT DOCUMENTS

| | | | |
|---|---|---|---|
| 2021/0055862 A1* | 2/2021 | Mulholland | G06F 3/0685 |
| 2022/0368613 A1* | 11/2022 | Darji | G06F 3/0604 |
| 2023/0198877 A1* | 6/2023 | Dickgiesser | G06F 11/302 709/224 |
| 2023/0409706 A1* | 12/2023 | Kutner | G06F 3/0623 |

* cited by examiner

*Primary Examiner* — Marcin R Filipczyk
(74) *Attorney, Agent, or Firm* — Staniford Tomita LLP

(57) ABSTRACT

Embodiments of a system and method to prevent mass deletion of data in a data storage system. A data deletion operation comprises a delete operation marking blocks to be deleted followed by a garbage collection (GC) operation to remove marked blocks from storage media. Based on historical information regarding deletions per GC cycle, the storage system can detect any significant deviations as potentially dangerous. If a deletion in excess of a deviation threshold is seen, the next GC operation is skipped to provide a delay period during which time the user can investigate the data delete command and restore data if necessary. De-risking conditions such as known abnormal high deletion periods or new system installation can be used to override any garbage collection delay.

18 Claims, 4 Drawing Sheets

MONITORING GARBAGE COLLECTION CYCLES TO PROTECT STORAGE SYSTEMS FROM DATA LOSS

TECHNICAL FIELD

Embodiments relate generally to data storage system protection, and more particularly to monitoring garbage collection cycles to protect against mass deletions.

BACKGROUND OF THE INVENTION

With the increasing need to secure data access in data storage systems, it is necessary to ensure that data is secure throughout its lifecycle from primary (active tier) to secondary (cloud/long-term) storage. It is also imperative to protect against full and partial deletion of user data.

In a deduplication data storage system, user data is backed up as files under one or more Merkle tree data structures. These can be spread across different storage tiers, such as: active, archive, cloud (from one or more cloud providers), and so on. Once backed up, a user expects and relies on such copies to be reliable.

However, in some cases either during decommissioning or reinitializing of a secondary storage system, such data needs to be destroyed. To support such use cases, a storage system may offer one or more operations that users perform to delete data, either on a system-wide basis or on a tier-wide basis. These features, however, can be exploited and used by intruders resulting in unintended data loss. Ransomware attacks are a common example of this vulnerability.

Valid and approved data destruction operations are required to be performed by users with administrative roles and to be authorized by appropriate personnel, such as security officers in an organization. Such personnel are usually very useful in protecting users from total data loss either system or tier-wide. However, these protection measures do not secure a user's data if an intruder with regular user credentials begins to delete mass amounts of files. Even deleting just a subset of files or directory trees within a tier or system may still cause major damage or loss even if it does not trigger any warnings.

What is needed, therefore, is a data security mechanism that protects against such potentially critical data loss scenarios.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
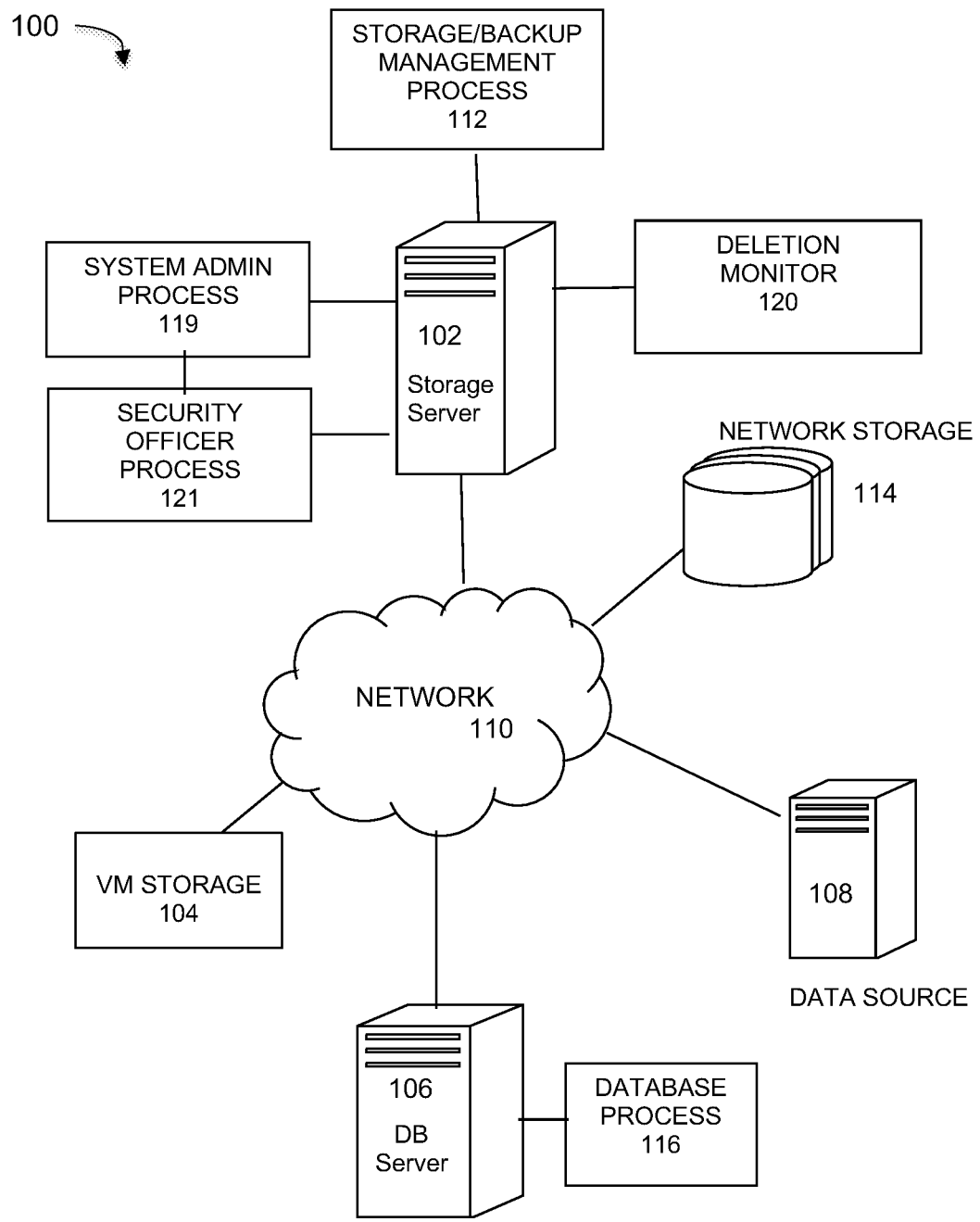
FIG. 1 is a diagram of a computing network implementing a process to prevent mass deletion of user data using garbage collection delay, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments of a storage system data security mechanism to monitor user data deletion operations across directory trees and files, and dynamically detect any malicious attempts to delete mass amounts of user data. Protection methods include delaying any garbage collection (GC) processes from permanently deleting potentially improperly marked data and providing a period of time for the user to restore such data.

FIG. 1 illustrates a networked data storage system that implements one or more embodiments of a mass data deletion monitoring and protection process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, data sources 108, and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. Such as system runs an operating system (OS) referred to as DDOS and/or a filesystem (FS) referred to as DDFS. However, other similar backup and storage systems are also possible.

The storage resources in system 100 may be organized into different tiers based on the data type and storage mode. For example, regular user data may be stored locally in hard disk storage 114 referred to as the 'active' or 'primary' tier, while legacy data or data moved to long-term storage may be stored in the cloud or older storage devices (e.g., tape) and referred to as 'cloud' or 'secondary' tier data. Other data storage tiers may include frequently used or recently used data that is stored in fast memory caches and referred to as 'cache tier' data.

Data Domain is an example of a purpose-built backup appliance providing streaming deduplication that is able to ingest data at full network speeds, from multiple backup sources while providing storage efficiency. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system, such as DDFS, that forms segments from data, these segments are uniquely identified by their key/label called a fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A DDFS file is thus represented by a Merkle tree, a B+Tree or a modified B+Tree (MTree) with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. We refer to segments above L0 as Lp chunks. The L6 segment of every file is stored in a namespace which is represented as a B+Tree. The L0 and Lp segments are written to separate containers, known as L0 and Lp containers.

The Merkle tree organized data may be spread across various data storage tiers (e.g., active and cloud tiers). Active or primary data is typically in present usage by one or more applications, and creation/modification/destruction of data in this tier is usually directly controlled by the users and applications. Any destruction of data is thus usually limited to specific user or application data and performed through directly executed application processes.

In a data storage system, users and applications regularly add data as well as delete data. Most storage systems protect system-wide data delete operations such as storage unit deletion or volume level destruction by requiring additional authorizations and/or other mechanisms. The appointment of a security officer (SO) role within the organization is an example of one such mechanism. A mass deletion operation may be initiated by a system administrator or other authorized user, but such a command must be validated or authorized by the security officer before it is actually executed. A system of credential-based access to applications and security checks is often sufficient in many cases. However, because of cost and complexity, such measures are often limited to commands that delete great masses of data at any one time. The deletion of lesser amounts of data may not trigger these mechanisms, but still constitute significant data whose loss can be damaging. For example, if an intruder deletes certain large subsets of data such as numbers of files, these system or tier-wide deletion detections may not be triggered, but users are still vulnerable to losing critical data.

Figure 2:
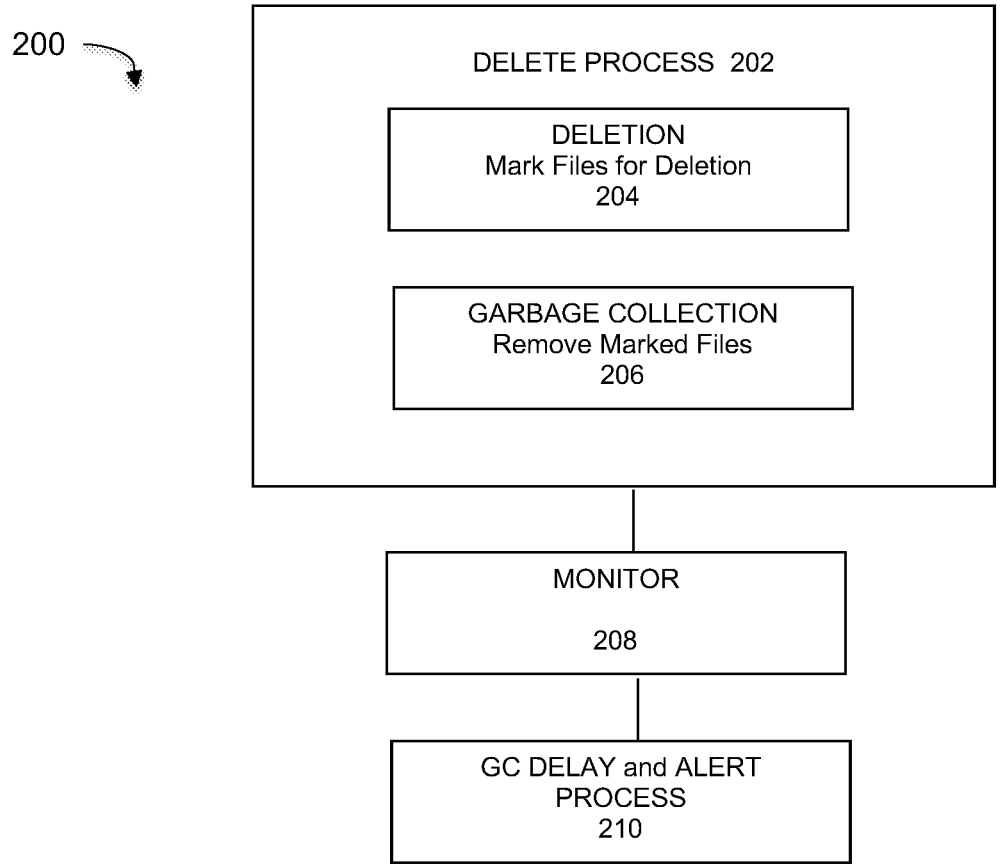
FIG. 2 is a diagram illustrating a delete process including a monitor and garbage collection delay process, under some embodiments.

FIG. 2 is a diagram illustrating a delete process including a monitor and garbage collection delay process, under some embodiments. In a deduplicating storage system, such as DDFS, user data is typically deleted in two phases. As shown in FIG. 2, a current standard delete process typically consists of a deletion phase 204 followed by a garbage collection phase 206. In the first phase of a delete operation, the user deletes user data, such as by moving files to trash or executing an explicit delete command, 204. Usually large numbers of files and directories can be selected for deletion at any one time, and other operations such as disk re-formatting may automatically delete all data on a device. During this phase, the metadata of the deleted files/directories is updated in the data storage system such that the files/directories appear deleted to the end user, however, the actual data blocks on the disk are not immediately freed up. They are simply marked as deleted so that they can be overwritten with new data or garbage collected out. If no new data overwrites a deleted block, that block may be continued to be stored on disk event if it is not visible to the user through the file system.

A second phase of the filesystem deletion operation is a garbage collection phase 206 in which unique content belonging to such deleted files/directories is removed/deleted (cleaned out) from the actual physical storage media, 206. In general, a garbage collection (GC) program is any program that manages the al location and release of memory for the applications or OS processes in a system. A typical garbage collection process has three distinct phases: (1) a marking phase that finds and creates a list of all live objects, (2) a relocating phase that updates the references to the objects that will be compacted, and (3) a compacting phase that reclaims the space occupied by the dead objects and compacts the surviving objects. The compacting phase moves objects that have survived a garbage collection toward the older end of a segment.

Garbage collection is typically provided as an operating system level utility that is executed automatically as a background script. Because it can impose a significant overhead on processing resources, it is usually run during non-peak hours and is configured to run in the background as a relatively low priority task. Garbage collection is usually performed automatically in accordance with a user-defined policy or schedule. Users may select the GC intervals to be once every day, week, or month, and so on, depending on the amount of data usually processed and deleted during a period of time, and their storage needs.

For the embodiment of FIG. 2, the storage system includes a monitor component 208 that monitors the delete process 202 to track user data deletions 204 over time. To protect against permanent loss of data, system 200 comprising the delete process 202 and the monitor 208 compiles past or historic delete patterns, determines if a present data delete operation exceeds this pattern, and if so, delays or temporarily block garbage collection 206 of the deleted data. As mentioned above the deletion operation 204 marks data selected to be deleted and the separate (and usually later) garbage collection operation 206 actually deletes these files/directories from the media. Thus, this two-part executed sequence, as provided in most deduplication and similar data storage systems, provides an opportunity to intercede and prevent permanent destruction, even for files marked for deletion. Data that is attacked (improperly deleted) can be saved from loss by delaying the GC phase from permanently deleting the data and providing the user time to countermand the deletion attempt.

In an embodiment, system 200 includes a garbage collection delay component or process 210 that delays the garbage collection by one or more scheduled intervals if an improper deletion command is detected by the monitor 208. A warning message can also be sent by this component to alert the user that a potentially dangerous deletion has been attempted and that remedial measures should be taken. The GC delay imposed by the system should ostensibly provide time to protect this data.

Figure 3:
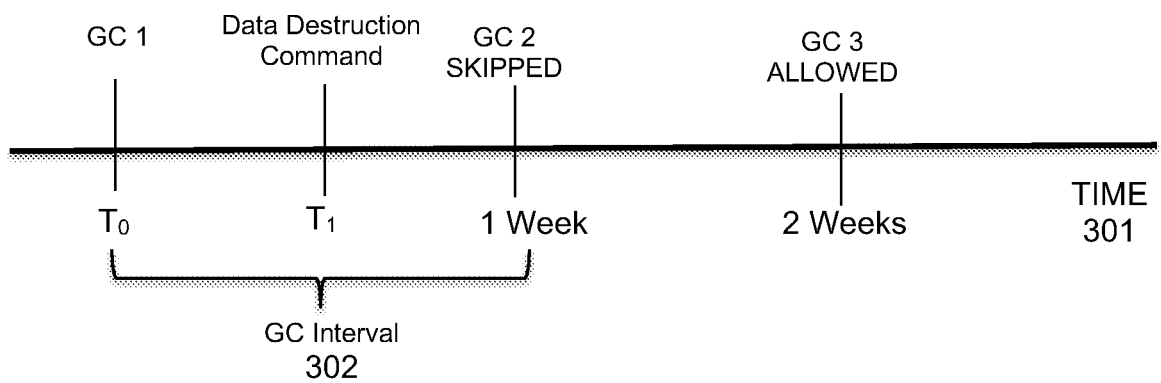
FIG. 3 illustrates an example of a delaying data deletions by skipping garbage collection cycles, under some embodiments.

FIG. 3 illustrates an example of delaying a data delete command by skipping garbage collection cycles, under some embodiments. FIG. 3 illustrates certain events along a time line 301. As shown in FIG. 3, garbage collection (GC) operations (denoted GC1, GC2, GC3, etc.) are scheduled to occur weekly starting from time $T_0$ to weekly intervals (1 week, 2 weeks, etc.) thereafter. The GC interval 302 thus comprises one week. It should be noted that this is only an example GC interval, and any other interval (e.g., daily, monthly, quarterly, etc.) may be used, but the GC interval is usually of a relatively large unit of time given the amount of data processing and resource use required.

For the example of FIG. 3, a data destruction command is detected at time $T_1$ along the time axis, and is within the GC interval 302. The monitor process 208 monitors this data deletion command and compares it to historical data for previous data deletions. If it determines that this delete command exceeds a defined threshold, meaning that a significantly large amount of data is marked for deletion, the next GC cycle will be skipped. For the example of FIG. 2, the delete command occurs at a time $T_1$ right after the first GC cycle (GC1) but before the next GC operation (GC2), hence GC2 will be skipped. This delay means that the garbage collection of this deleted data may not occur until up to two weeks after the deletion, instead of up to one week after. However, this delay is acceptable if the value and chance of saving the deleted data outweighs the processing overhead imposed by delaying a regularly scheduled garbage collection operation.

The amount of delay in example of FIG. 3, is shown to be one GC interval, however embodiments are not so limited. Any number of GC intervals can be used (e.g., two, three, etc.) depending on system constraints and requirements. Similarly, the interval of a day or days can comprise natural days or business days, as appropriate for the system.

For the embodiment of FIG. 2, if the data destruction command 301 is deemed to be a genuine attempt to destroy data, the next GC cycle (GC2) will not be skipped. In an embodiment, the GC delay process may impose a GC interval skip based purely on the size of the dataset marked for deletion. The system 200 then sends an alert to the user about this deletion attempt and provides the user the opportunity to respond with a validation command that the deletion is genuine. This then suspends the skipping of the next GC operation, and allows it to proceed as scheduled. Alternatively, the system can determine that the data destruction command is sufficiently large and that it is either genuine or not genuine at the time of receipt of the command, such as through an immediate and direct query to the system admin or security officer. If an invalid or no response is received, the system can then automatically impose the delay by skipping the next one or more GC cycles, as per the system configuration.

As shown and described above, if an attempted data destruction command involves a certain amount of data, the GC operation following that delete command is skipped for a number of GC intervals and an alert is sent to the user to let them know of potential unauthorized operations. This allows the user to be aware of and log potential data breaches, as well as take additional remedial measures, such as suspending or extending GC intervals, or imposing comprehensive system monitoring, data auditing, and other protections.

In an embodiment, the GC delay operation 210 is triggered by the monitor component 208. This component compiles or uses compiled historical data regarding past user deletions in the normal course of business or system operations. This historical data provides a baseline for comparison with a present or current delete command. It may be provided as a histogram of data deletions, or as a range from a maximum amount to a minimum amount of data deleted during GC intervals over a period of time. This data is parsed and processed as an average amount of data deleted per GC cycle 302. Based on this historical data, the storage system can then detect any significant deviations as evidence of suspicious deletion commands.

With respect to measurement of data deletion amounts, embodiments use data organization standards of the system 100 operating system. For example, in a deduplication system such as DDOS, unique data from multiple files are stored in a group of objects called containers. The containers are internally made up of group of compression regions that contain compressed data from unique segments of data. These containers have metadata representing the unique fingerprints contained within them. Certain input/output (I/O) measurement processes can be used to measure delete operations performed on containers, files, directories or other similar data elements, as appropriate.

When a file is deleted by an application, the metadata is updated to disassociate the segments/regions/containers from that file, but those containers are not reused immediately until the next garbage collection cycle occurs. The monitor process 208 continuously monitors the system 200 for amount of user data deleted across any two consecutive GC cycles (e.g., GC interval 302) and uses the pre-defined threshold value to trigger a GC delay, if necessary.

The defined deviation threshold can be a set value, e.g., 5 TB in any one delete command or in a sum of multiple delete commands in a GC interval 302. Alternatively, it may be a percentage deviation by an average or fixed amount of data normally deleted in a GC interval, as compiled from the historical data. For example, if, within in any single GC interval, the amount of data deleted offshoots a maximum amount of data deleted by a percentage or more (e.g., 50%) representing the deviation threshold), the event is detected as a mass delete event. Other similar methods of defining a normal data deletion value and determining a deviation from this value to trigger a GC delay, can be used.

For example, if the defined percentage is 50%, a deviation may be detected if the amount of data deleted in a set of GC cycles appears like the following:

GC1=1 TB|GC2=1 TB1|GC3=2 TB.

In this case, the data deleted in GC3 is double (100%) greater than that of GC1 and GC2 (the historical data). Since this is greater than 50%, GC3 will be skipped to provide a delay that allows the user to check and rectify the delete command, if necessary.

Figure 4:
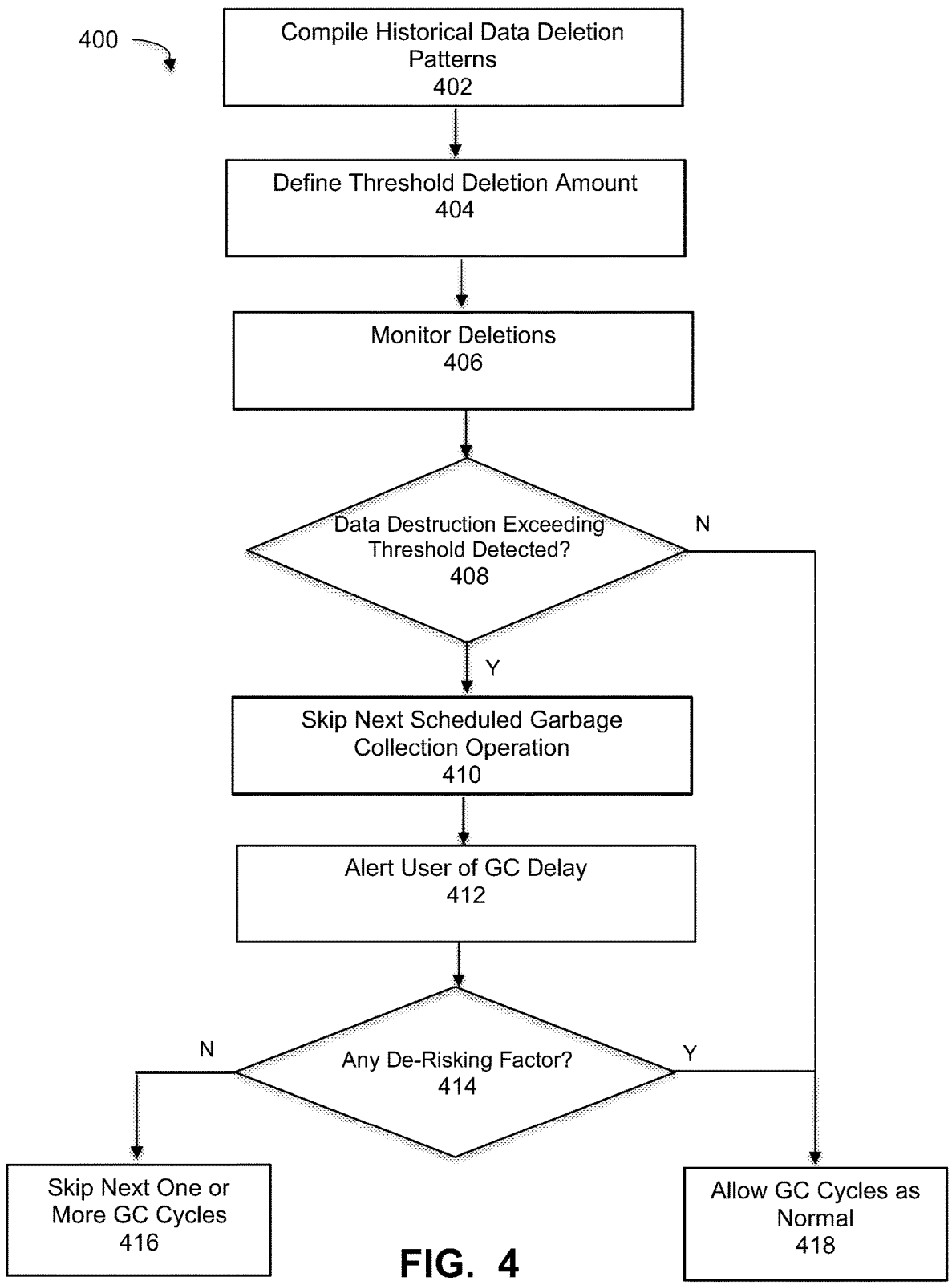
FIG. 4 is a flowchart that illustrates a method of delaying a garbage collection cycle to prevent mass deletion of user data, under some embodiments.

FIG. 4 is a flowchart that illustrates a method of delaying a garbage collection cycle to prevent mass deletion of user data, under some embodiments. As shown in FIG. 4, process 400 begins with the compilation of historical data deletion patterns, 402, such as by using OS specific data definitions, as described above. The threshold deviation value is then defined 404. This can be a percentage of the maximum of data deleted within the system for the overall historical measured period of time, or it may be an absolute scalar value (e.g., 5 TB), or any other similar threshold value defining method.

Each delete operation performed by a user in the system is then monitored, 406, to determine if the amount of data to be deleted is in excess of the threshold value or deviates from an allowed deviation threshold (e.g., 50% deviation from a maximum deletion amount). If, in step 408, it is determined that a delete command deletes an amount of data exceeding or deviating from the allowed threshold, the delete process 202 skips the next one or more scheduled GC cycles, 410. An alert may also be issued to notify the user about such an event, 412. This gives user a window of time to recover the deleted files if desired and before permanent loss by the GC processes. Depending on system implementation, certain tools and utilities may be provided so that metadata can be re-stitched back together to recover the file.

In an embodiment, the GC delay 410 and the user alert 412 steps may be performed together, or the alert 412 may precede the GC delay 410, or vice-versa. If at any time, a user notices that the deletions were done by themselves, they can simply ignore the alerts and force the next GC cycle if necessary.

In some systems, the GC process may be an automated process performed automatically by the system in accordance with a defined threshold. Alternatively, the GC process may be a manual or semi-automated process where a system admin or similar personnel must initiate the GC operation in each interval. In this case, an automated interval will not be skipped, but instead, a next manual GC interval would need to be authorized by an authorizing/security officer. Such a step can be performed using the security officer process 121 of FIG. 1, which provides an extra layer of validation for important commands within the system.

This provides users a defined window of time for the user level files/directories to be restored. If a genuine delete operation performed by the user, then the security officer authorized GC operation can still be completed as desired.

This historical data used in step 402 can be compiled and processed using known data compilation and modeling operations to derive a body of data that a user can rely on with a certain degree of confidence. Data deletion patterns may vary depending on system age and usage. For example, during initial deployments, the deviations in data deletion amounts can be higher as data is added and replaced frequently. This usually settles over time as the system is deployed and as the amount of user data increases on the storage system, so that the deviation progressively becomes limited to a smaller value. That is, right after the initial deployment of a storage system, there can be quite a few false positives, which should be disregarded to prevent improper delay of the GC process. Such a factor is referred to as a 'de-risking' factor and represents a condition that may trigger the delay based on an amount of data deleted, but that is explained or justified by other circumstances and thus represents a low probability of danger, such as from a deliberate data attack. Recency of system installation is one example of a condition yielding a de-risking factor, and other similar scenarios are also possible, including periodic purging of expired data, organizational restructuring events, recent filesystem creation, and so on.

As shown in FIG. 4, process 400 includes certain processing steps to avoid undue delay of GC cycles. Thus, in step 414 it is determined whether or not any such de-risking factor applies. If it does not apply, the next one or more GC cycles is skipped, 416. Otherwise, the next GC cycle or cycles are allowed to proceed as scheduled, 418.

The de-risking factor in step 414 can be determined by any appropriate mechanism. For example, if recency of system installation is such a factor, the system can check and verify that system capacity usage is less than a certain percentage, such as 5% or less. This indicates a new or re-installed system that does not have much user data relative to overall system capacity. In this case, any stored data may have limited value, or comprise data that is rapidly developing and that should be permanently deleted as timely as possible. As user data in the system grows, the detection process will more accurately detect unusual behavior and provide value to users. The deviation threshold and the capacity threshold can both be user configurable to allow for adaptation as the system and user interactions evolve.

With respect to the capacity usage measure, on an ongoing basis, DDFS monitors the amount of data ingested to it, and it also knows the maximum capacity of the system. This is used to then calculate what percentage of capacity has been utilized on the system. If the data capacity ingested is lower than a percentage threshold (e.g., <5%), the system is very likely new or just recently re-installed, resulting in only very little metadata currently stored. The 5% threshold is provided as an example only, and other percentage thresholds can be used depending on system configuration and data usage patterns. A data ingest counter is used to keep track of the amount of data gathered into the system, and any relevant measure of data I/O can be used, such as the number of containers per unit of time.

In an embodiment, certain patterns of system behavior may be used to help automatically trigger the GC delay determination process 408 and delay step 416. The system may be configured to automatically to recognize and classify certain conditions as potentially dangerous or indicative of an attack. Deliberate malicious attacks by hackers, data thieves, and so on usually conform to recognizable patterns. For example, a typical attack may occur at specific days or times, and involve a certain threshold amount of data. Additionally, such attacks may be preceded by other sys admin operations, such as appointing a security officer, advancing the system clock, turning off alerts, or performing these and other operations in specific sequences. If such a suspicious set of events occurs, this provides good indication that the data delete operation is malicious and dangerous, in which case, the threshold value may be lowered so that the system delays GC processing for lower amounts of data instead of the higher defined threshold. Likewise, if these steps are not detected, this might provide evidence of a de-risking factor that can suspend the GC delay even for large amounts of data.

Embodiments of the processes and techniques described above can be implemented on any appropriate data storage or backup system operating environment or file system, or network server system. Such embodiments may include other or alternative data structures or definitions as needed or appropriate.

Figure 5:
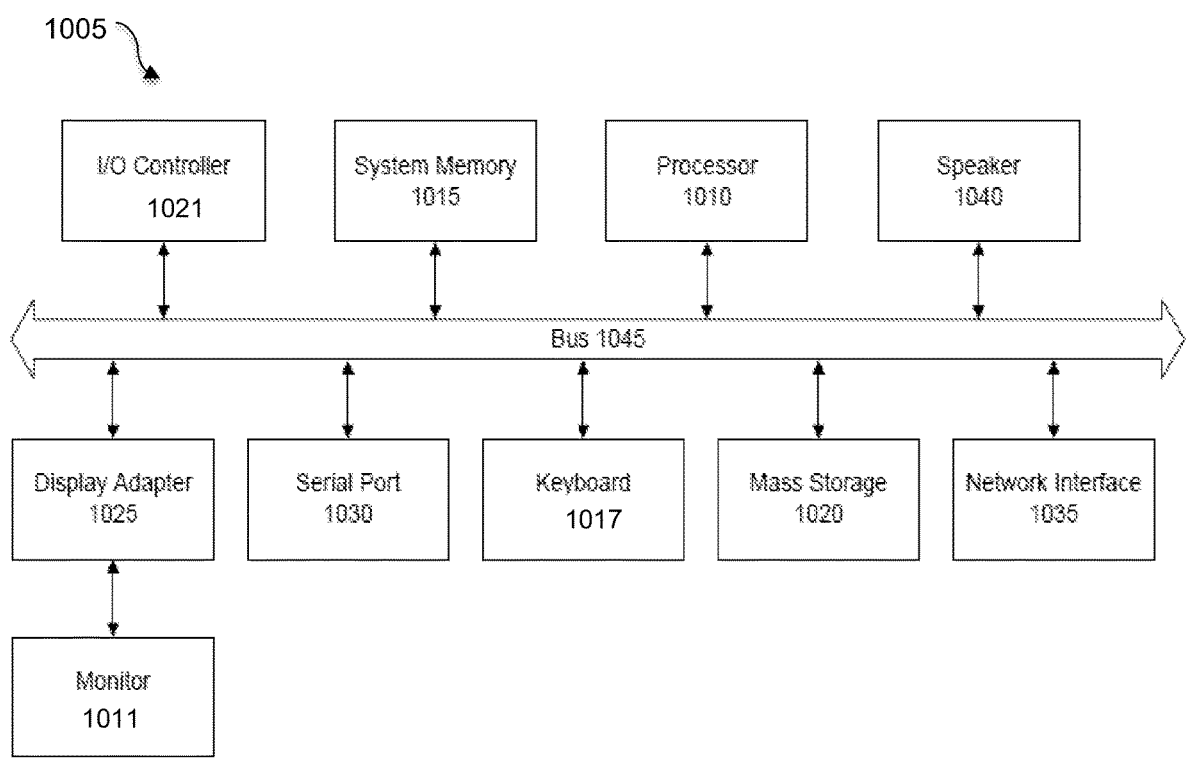
FIG. 5 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 5 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method, comprising:
   monitoring data deletion operations in a data storage system;
   compiling historical data of amounts of data deleted using garbage collection (GC) operations in a past sequence of GC operations;
   defining a threshold deletion amount based on the historical data;
   determining if a received delete operation causes an upcoming GC operation to delete data exceeding the defined threshold;
   measuring an amount of data deleted in each GC operation of the past sequence of GC operations;
   determining a maximum amount of data deleted in a GC interval from each measured amount of data;
   defining a minimum percentage deviation from the maximum amount as the threshold deletion amount; and
   skipping, if the defined threshold is exceeded, the upcoming GC operation and alerting the user of a potential unauthorized data destruction command, otherwise, executing the upcoming GC operation.

2. The method of claim 1 wherein the GC operation is part of a two-phase data deletion operation comprising:
   marking data blocks for deletion upon issuance of a delete command by a user; and
   permanently removing the marked data blocks from storage media in the upcoming GC operation.

3. The method of claim 2 wherein the sequence of GC operations comprises a fixed interval between consecutive GC operations as set by a user-defined schedule.

4. The method of claim 3 further comprising skipping one or more subsequent GC operations in addition to the upcoming GC operation as specified by user input.

5. The method of claim 1 wherein the skipping step provides an amount of time for the user to investigate the received delete operation and recover correspondingly deleted data prior to the current GC operation.

6. The method of claim 5 further comprising checking for one or more de-risking factors justifying the received delete operation.

7. The method of claim 6 wherein the de-risking factors comprise a recency of installation or re-installation of the data storage system and a percentage amount of data capacity usage in the data storage system.

8. The method of claim 1 wherein the threshold deletion amount is defined by:
   measuring an amount of data deleted in each GC operation of the past sequence of GC operations;
   determining an average amount of data deleted in each GC interval from each measured amount of data; and
   defining the average amount as a minimum threshold deletion amount.

9. The method of claim 1 wherein the upcoming GC operation comprises one of: a GC operation automatically executed in accordance with an automated schedule, or a GC operation initiated manually by a system administrator and authorized by a security officer.

10. A method of preventing data destruction of a large amount of data in a data storage system, comprising:
    receiving a command to delete a large amount of data resulting in marking of data blocks to be deleted;

scheduling a garbage collection (GC) operation to delete marked data blocks from storage media as part of a sequence of GC operations;

measuring an amount of data deleted in each GC operation of the past sequence of GC operations;

determining a maximum amount of data deleted in a GC interval from each measured amount of data;

defining a minimum percentage deviation from the maximum amount as the threshold deletion amount;

determining if a number of marked data blocks for a current GC operation exceeds a defined threshold; and sending an alert message to a user and skipping at least the current GC operation if the number of marked data blocks exceeds the defined threshold, otherwise executing the current GC operation.

11. The method of claim 10 wherein the sequence of GC operations comprises a fixed interval between consecutive GC operations as set by a user-defined schedule, and as executed automatically as part of an automated sequence, or manually by user initiation.

12. The method of claim 10 further comprising:

collecting historical data of data deletions in past GC operations of the GC operations;

determining at least one of: a maximum amount of data deleted in a GC operation of the sequence of GC operations, or an average amount of data deleted in a GC operation for the sequence of GC operations; and deriving the defined threshold from one of the maximum amount or the average amount.

13. The method of claim 10 wherein the skipping step provides an amount of time for the user to investigate the received delete operation and recover correspondingly deleted data prior to the current GC operation.

14. The method of claim 13 further comprising checking for one or more de-risking factors justifying the received delete operation.

15. The method of claim 14 wherein the de-risking factors comprise a recency of installation or re-installation of the data storage system and a percentage amount of data capacity usage in the data storage system.

16. A method of preventing data destruction of a large amount of data in a data storage system, comprising:

receiving a command to delete a large amount of data resulting in marking of data blocks to be deleted and permanently removed through a scheduled garbage collection (GC) operation;

determining if a number of marked data blocks for a current GC operation exceeds a defined threshold;

determining if one or more de-risking factors applies to allow garbage collection of the marked data blocks;

sending a user alert and skipping at least the current GC operation if the number of marked data blocks exceeds the defined threshold and no de-risking factor applies, otherwise executing the current GC operation;

collecting historical data of data deletions in past GC operations of the GC operations;

determining at least one of: a maximum amount of data deleted in a GC operation of the sequence of GC operations, or an average amount of data deleted in a GC operation for the sequence of GC operations; and deriving the defined threshold from one of the maximum amount or the average amount.

17. The method of claim 16 wherein the sequence of GC operations comprises a fixed interval between consecutive GC operations as set by a user-defined schedule, and as executed automatically as part of an automated sequence, or manually by user initiation.

18. The method of claim 16 wherein the de-risking factors comprise a recency of installation or re-installation of the data storage system and a percentage amount of data capacity usage in the data storage system.

* * * * *